March 19, 1963 F. DEL CHIOCCA 3,082,423
TIME RECORDING MANEUVERING SYSTEM AND SAFETY DEVICE
Filed June 25, 1958 7 Sheets-Sheet 1

FIG. 1.

INVENTOR
Frank del Chiocca
BY
Peck & Peck
ATTORNEYS

March 19, 1963  F. DEL CHIOCCA  3,082,423
TIME RECORDING MANEUVERING SYSTEM AND SAFETY DEVICE
Filed June 25, 1958  7 Sheets-Sheet 2

FIG. 2

INVENTOR
Frank del Chiocca
BY
Peck & Peck
ATTORNEYS

March 19, 1963 F. DEL CHIOCCA 3,082,423
TIME RECORDING MANEUVERING SYSTEM AND SAFETY DEVICE
Filed June 25, 1958 7 Sheets-Sheet 3

FIG. 3.

INVENTOR
Frank del Chiocca
BY
Peck & Peck
ATTORNEYS

March 19, 1963 — F. DEL CHIOCCA — 3,082,423
TIME RECORDING MANEUVERING SYSTEM AND SAFETY DEVICE
Filed June 25, 1958 — 7 Sheets-Sheet 7

FIG. 9B.

INVENTOR.
Frank del Chiocca
BY Peck & Peck
ATTORNEYS

United States Patent Office 3,082,423
Patented Mar. 19, 1963

3,082,423
TIME RECORDING MANEUVERING SYSTEM
AND SAFETY DEVICE
Frank del Chiocca, New York, N.Y., assignor to McNab, Incorporated, New York, N.Y., a corporation of New York
Filed June 25, 1958, Ser. No. 744,467
3 Claims. (Cl. 346—33)

This invention relates broadly to the art of marine maneuvering systems and the chronological recording of the maneuvers ordered and made, and its more specific aspects it relates to such systems wherein a permanent record is automatically made of the order given and the response thereto, the time of both as well as the r.p.m. of the engine speed and rudder angle with the same chronological detail, and the system includes safety means automatically preventing operation of the "ahead" valve when an "astern" order is given and vice versa; and the nature and objects of the invention will be readily recognized and understood by those skilled in the arts to which it relates in the light of the following explanation and detailed description of the accompanying drawings illustrating what I at present believe to be preferred embodiments or mechanical expressions of my invention from amoung various other forms, arrangements, combinations and constructions, of which the invention is capable within the spirit and scope thereof.

For a variety of reasons it is desirable to have a permanent record of the signals given and the responses thereto in the maneuvering of a ship. This is true not only with respect to ocean going vessels but also with respect to tugs, ferries and all classes of ships, and will be found to be especially advantageous when used on ships operating in congested waters.

The recording system which I have devised not only automatically records the order given on the ship's telegraph but it also records the operational response to each such order and it records the exact time of the order and response, including the month, day, hour, minute and tenth of minute. Simultaneously with the aforementioned recordation the system also records the r.p.m. of the engine speed and the angle of the rudder, each being recorded with the above mentioned chronological data. Thus, at a certain time, the order given and the response thereto as well as the speed of the engines and the rudder position may be quickly and easily and accurately determined.

A novel and ingenious characteristic of my invention resides in the provision of means in the system which is automatically operable to lock the "astern" valve when the "ahead" order is given and vice versa. It will be recognized that such a safety device is highly advantageous for it prevents the engineer or other operational personnel from reversing the order given which might, and has in many instances, result in serious consequences.

It has been one of my purposes to provide a system of this character which may be installed on existing ship's telegraphs to thereby reduce installation costs. It has also been one of my purposes to evolve a recording system for ship's telegraphs which is relatively inexpensive to produce, install and operate and is sure and certain in its operation and will require little or no maintenance and/or supervision.

The advantages of a recording system of the type embodied in this invention will be substantial in legal proceedings following a mishap, in determining the versatility of a marine officer in maneuvering his ship and in many other ways. A system involving the features of my invention would reduce the number of accidents which should result in the reduction of marine insurance rates.

With the foregoing general objects, features and results in view, as well as certain others which will be apparent from the following explanation, the invention consists in certain novel features in design, construction, mounting and combination of elements, as will be more fully and particularly referred to and specified hereinafter.

Referring to the accompanying drawings.

Figure 1:
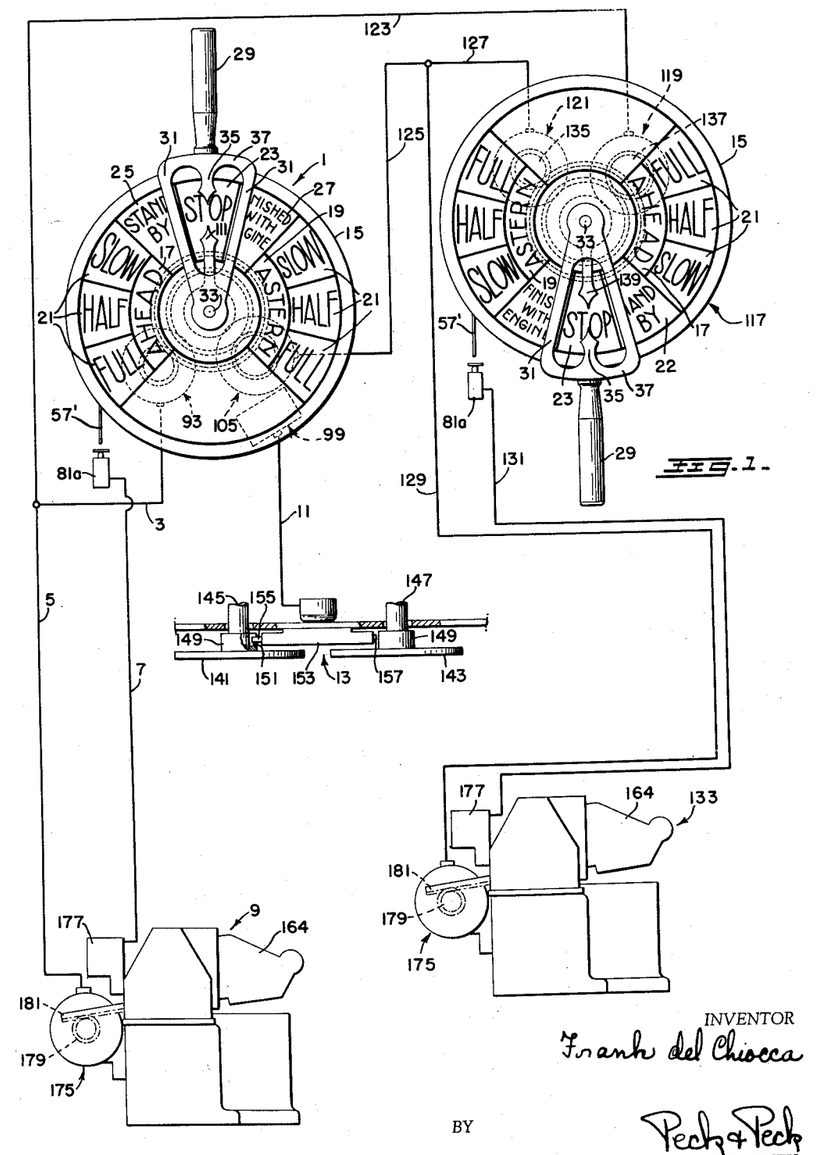
FIG. 1 is a schematic view of the ship's telegraph system illustrating the instrument located on the bridge or wheel house of the ship which is connected to the telegraph instrument in the engine room of the ship, and illustrating the automatic recorders connected in the system, one being connected to the bridge telegraph instrument and the others to the engine room instrument.

In the accompanying drawings, and particularly FIG. 1 thereof, I have disclosed a ship's telegraph instrument which I have designated in its entirety by the numeral 1. This instrument is installed on the bridge of a ship or at any other control point and is electrically connected, as by electric conductors 3, 5 and 7, with a recording device designated generally by the numeral 9. The recording device 9 may be positioned at any suitable location, either remote from or adjacent to the instrument 1. The instrument 1 is also electrically connected by lead 11 to a safety device indicated in its entirety by numeral 13.

The instrument 1 may comprise a generally cylindrical housing 15 in which certain of the operating elements to be described are housed. As is conventional the opposing faces of the housing are provided with indicia which is arranged with an "ahead" segment 17 and an "astern" segment 19, each being divided into the usual operational signals "slow," "half" and "full" sections 21. The faces of the housing may also be provided with such indicia forming a "stop" section 23, a "stand by" section 25 and a "finished with engine" section 27. An operating lever having a handle 29 and spaced arms 31 depending therefrom downwardly on each side of the housing is operatively mounted on and fixed to a spindle 33 which extends through the center of the housing and outwardly beyond each face thereof. The space between the arms 31 is substantially equal to each signal section 21, 23, 25 and 27, and a downwardly directed arrow 35 is fixed to a bridge 37 connecting the upper ends of the arms to extend downwardly intermediate the arms. It is well understood that the officer on the bridge in maneuvering his ship actuates the control lever to the signal section desired whereupon the same signal will be transmitted to the engine room.

Figure 2:
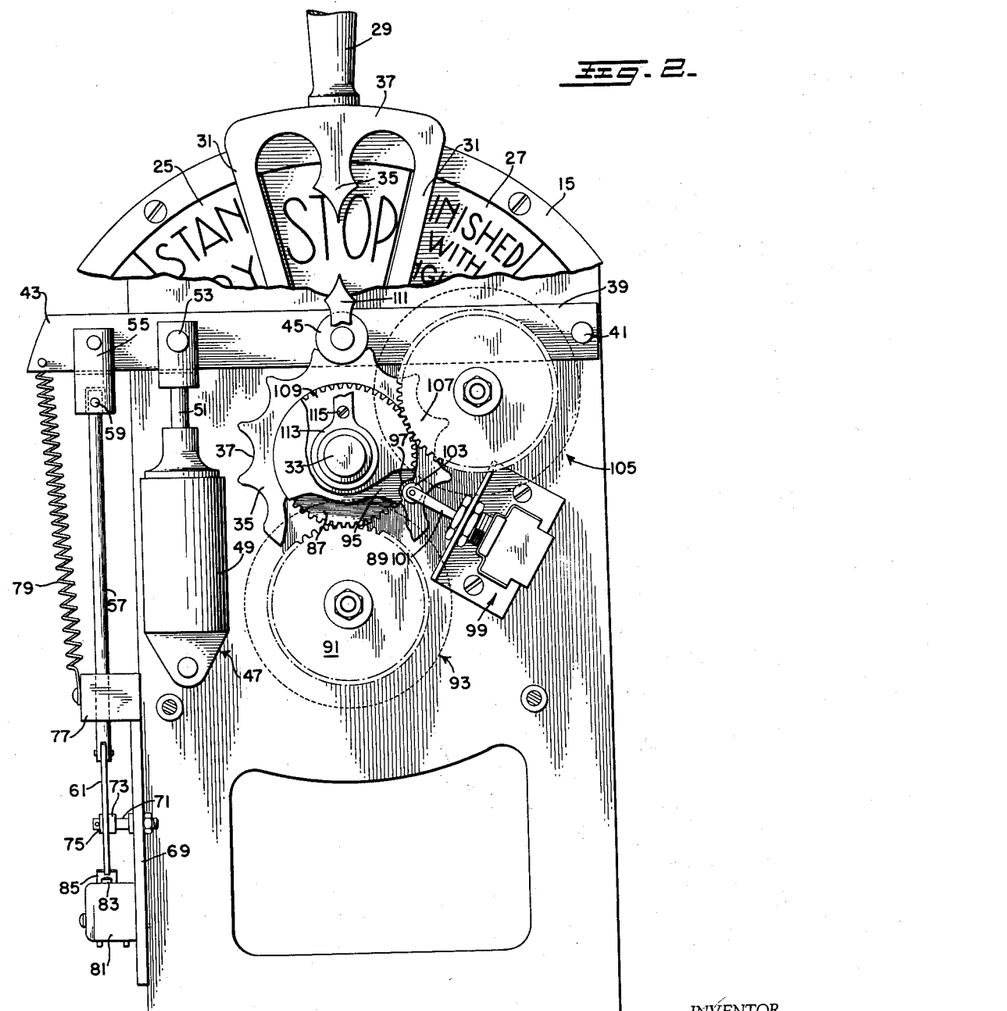
FIG. 2 is a view in front elevation of the order giving instrument which may be positioned on the bridge of the ship.

In FIG. 2 of the drawings I have illustrated certain operating mechanism which is housed within housing 15 of the ship's telegraph 1 and which is operated upon actuation of lever 29 to cause the permanent record to be made as will be hereinafter described in detail.

Fixed to the spindle 33 for rotation therewith is a wheel 35 having a continuous notched periphery 37, the wheel, as will become apparent, operates in the manner of a plate cam. An arm or rocking member 39 is pivotally mounted at one end within the housing as at 41 and extends across the housing adjacent to but removed from the vertical plane of the wheel 35. The free end 43 of the rocking arm, preferably, though not necessarily, extends exteriorly of the casing. Fixed to rocking member 39 is a roller or follower 45, positioned on the arm in such relation with respect to the wheel 35 that it will seat in the notch or recess in the periphery of the wheel which is in uppermost position.

Adjacent to but inwardly spaced from the outer end of the rocking arm 39 I mount a conventional dash-pot assembly designated generally by the numeral 47, such assembly comprising a usual cylinder 49 mounted in the casing. As is customary the cylinder may contain either air or liquid to cushion and retard the inward movement of a usual piston fixed on the end of a piston rod 51 which projects upwardly from the cylinder for pivotal connection to the rocking arm 39 as at 53. Spaced outwardly from the dash-pot assembly I fix on arm 39 a depending bracket 55 which is preferably inwardly spaced from the arm extremity. A rod 57 is pivotally attached as at 59 to bracket 55. On and depending from the lower end of rod 57 is a rectangular trip plate member 61 which is formed with an upper longitudinally extending slot 63 and a lower longitudinally extending slot 65 which are laterally displaced with respect to one another but are in communication with each other through an angular connecting slot 67. The housing 15 is provided with any suitable support plate 69, which may be an end wall, bracket or the like to which is bolted a stem 71 having a flange 73 thereon and a washer or the like 75 fixed on the end of the stem. As will be apparent from consideration of the drawings the stem extends through the slot in the trip plate with the flange on one side thereof and the washer on the other. At the upper end of the plate 69 an L-shaped bracket 77 is fixed and a coil tension spring 79 extends between and is fixed at one end to the free end of the rocking arm 39 and at its other end to the bracket 77. Also fixed to the plate 69 is an electric switch 81 having a circuit controlling plunger 83 in normal position projected upwardly to extend out of the switch 81. A flexible arm 85 is fixed to the upper surface of the switch to extend over the plunger 83, the normal position of these elements being disclosed in FIG. 6, the circuit being open when the elements are in the illustrated position. The switch and arm assembly are so related with respect to the trip plate 61 so that, as will become apparent as this description proceeds, the trip plate in its vertical movements being swung by the guide stem operating in the slots will, when in uppermost position be above arm 85 and as it is lowered it will depress the arm and the plunger to close the switch and as the trip plate continues its downward movement the stem will move into slot 63 to thereby move the trip plate laterally and beside the arm (the position illustrated in FIG. 6) so that arm 85 being free of the plate will flex upwardly into inoperative position releasing plunger 83 for its upward projection to open the circuit controlled by the switch. There will thus be only a momentary closing of the switch.

Figures 4, 10, 11:
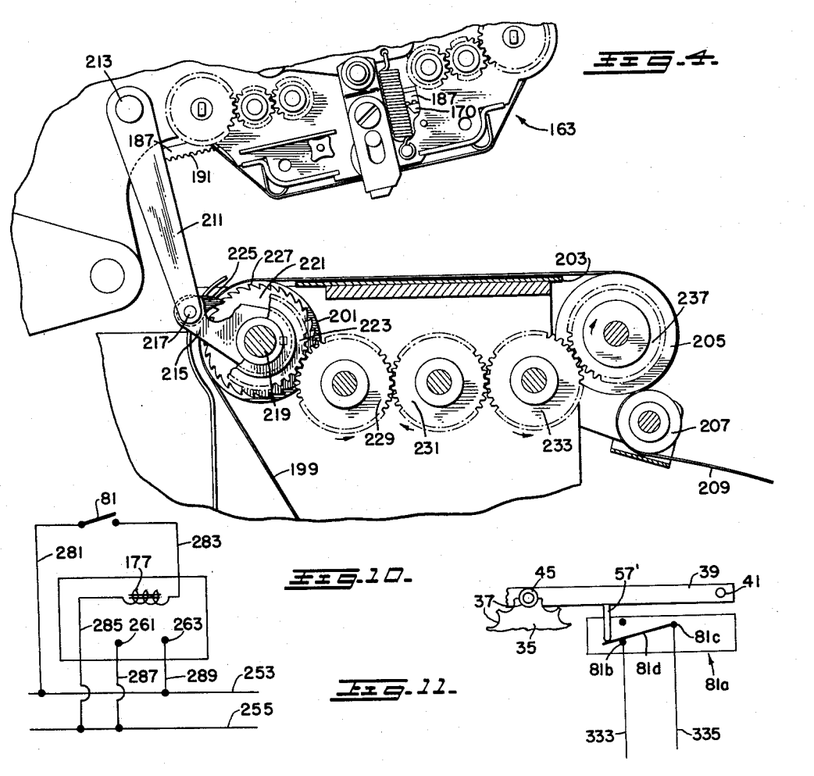
FIG. 4 is a detail view in section of the recording device illustrating the mechanism for advancing the data-receiving web following each operation of the recording device.
FIG. 10 is a schematic diagram showing a recorder actuating circuit using a mechanical time delay switch.
FIG. 11 is a schematic illustration of the switch opening and closing mechanism for use with electrical time delay circuit closing means.

The switch tripping mechanism which has been disclosed is what I shall term the "mechanical time delay switching mechanism" and, as will become apparent as this description proceeds, is used with the recorder circuits illustrated in FIG. 10 of the drawings. I have also devised what I shall term an "electrical time delay switching mechanism" which I shall later describe, this mechanism being illustrated particularly in FIGS. 9 and 11 of the drawings.

I also fix a gear 87 on the spindle 33 for rotation therewith as the spindle is caused to rotate when the control lever is actuated from one signal station to the other. The teeth of the gear 87 are in mesh with the teeth 89 provided on a gear 91 forming a control element on a conventional synchro-transmitter or selsyn designated in its entirety by the numeral 93. Rotation of gear 91 causes the selsyn to transmit a signal to a synchro-receiver or selsyn (to be described) which is coincident with signal station to which the control lever is moved.

A further wheel 95 is fixed on spindle 33 for rotation therewith. The periphery of the wheel 95 is formed with a notch or recess 97 therein. I mount in the housing a double pole double throw type of switch designated generally by the numeral 99, the control arm of the switch comprising a swingable arm 101 having on the outer end thereof a roller 103 adapted to extend into recess 97 in wheel 95 and to be swung in one direction or the other when the wheel is rotated by movement of control lever 29. The switch 99 controls the operation of a safety mechanism to be described hereinafter.

As will be explained means are provided on the ship's telegraph instrument 1 which is located on the bridge of the ship for visually indicating the engine room response to a transmitted order or signal and as a part of such means I provide a synchro-receiver or selsyn indicated generally by the numeral 105. This selsyn 105 is mounted in the housing 15 and includes a gear 107 operated by the conventional rotor of the selsyn, the teeth of gear 107 being in mesh with the teeth of a further gear 109 which is loosely mounted on spindle 33 for relative rotation with respect thereto. I provide an arrow 111 or other visual indicating means, the upper part of which extends outside the casing for operation over and adjacent the signal stations 21, 23 and 25 on the dial of the instrument. The arrow 111 is mounted by means of a collar 113 loosely embracing spindle 33, the stem of the arrow being fixed to gear 109 by means of a set screw 115. Thus, upon rotation of gear 107, rotation will be induced in gear 109 and the arrow 111 will swing across the dial of the telegraph instrument.

In FIG. 1 of the drawings I have illustrated a further ship's telegraph which is located in the engine room of the vessel and I have designated this instrument in its entirety by the reference numeral 117. The engine room telegraph instrument 117 includes a synchro-receiver or selsyn designated generally by the numeral 119 and a synchro-transmitter or selsyn designated generally by the numeral 121. The synchro-receiver 119, being connected to the synchro-transmitter 93 by conductor 123 while the synchro-transmitter 121 is connected to the synchro-receiver 105 by a conductor 125. The engine room telegraph is electrically connected, as by electrical conductors 127, 129 and 131, with control means for a recording device designated generally by the numeral 133. The recording device may be positioned at any suitable location either remote from or adjacent to instrument 117 and preferably near recording device 9.

The engine room telegraph instrument 117 consists of a housing having indicia on the faces thereof all of which are substantially the same as those described in connection with the telegraph instrument 1, and bear the same reference numerals. The instrument 117 is provided with the same control lever assembly comprised of elements 29, 31, 35 and 37 which is fixed on the spindle 33.

Within the housing 15 of the engine room telegraph instrument 117 is mounted the same arrangement and mechanisms as are located in bridge instrument 1 with the exception of the wheel 95 and switch assembly 99 which are incorporated in instrument 117. Within engine room instrument 117 is mounted the notched wheel 35, a roller or follower 45 fixed on a rocker arm 39, a dash-pot assembly 47, a trip plate 61 mounted and operated as described in connection with the instrument 1. There is also provided the switch assembly 81.

The instrument 117 also includes the gear 87 which is fixed on spindle 33, the teeth of which are in mesh with the teeth of a gear 135 forming a control element on the synchro-transmitter 121.

The synchro-receiver 119 on instrument 117 includes a gear 137 operated by the conventional rotor of the receiver 119, the teeth of the gear 137 being in mesh with the teeth of a gear corresponding to gear 109 of instrument 1, the gear being loosely mounted on spindle 33. In instrument 117 I provide an arrow 139 similar to arrow 111 of instrument 1, this arrow being mounted and operated by gear 109 in the same manner as hereinbefore described in connection with instrument 1.

As stated above my system provides automatic means for automatically locking the "ahead" valve when an "astern" order is given by the bridge instrument 1, and vice versa. This automatic means is schematically illustrated in FIG. 1 and the element 141 characterizes the "astern" valve while the element 143 characterizes the "ahead" valve. Each element is mounted on a separate shaft 145 and 147 by means of hubs 149 each of which is formed with an opening 151 therein. I provide a double solenoid 153 positioned between elements 141 and 143, the armature 155 of one solenoid being projectible when energized into opening 151 in the hub of the "astern" valve to lock it in closed position while the armature 157 of the other solenoid being projectible into opening 151 in the hub of the "ahead" valve to lock it in closed position. The solenoids are electrically connected by lead 11 with the double pole, double throw switch assembly 99.

Connected into the system in a manner to be described in more detail hereinafter are a pair of recorders 9 and 133, the former adapted to record the data transmitted by the telegraph instrument 1 and the latter adapted to record the data transmitted by telegraph instrument 117. As will be explained the recorder 9 will record the signal given by the instrument, the date and the time given down to the tenth of a second. The recorder 133 will permanently record the same data with respect to the response by the engineer on the engine room telegraph instrument 117.

Each recorder used in my system is automatic and electrically controlled, and may, for example, involve the basic operating and control mechanisms disclosed in Patent No. 2,214,796, issued on September 17, 1940, to Ernest S. Ostler, with the modifications about to be described which adapt such type recorder for the purposes of my invention.

The recorders 9 and 133 are the same, except that the former is connected to telegraph instrument 1 to permanently record information being transmitted by that instrument while the latter is connected to telegraph instrument 117 to permanently record the information being transmitted by that instrument. Since the recorders 9 and 133 are the same only one will be described in detail.

Figure 3:
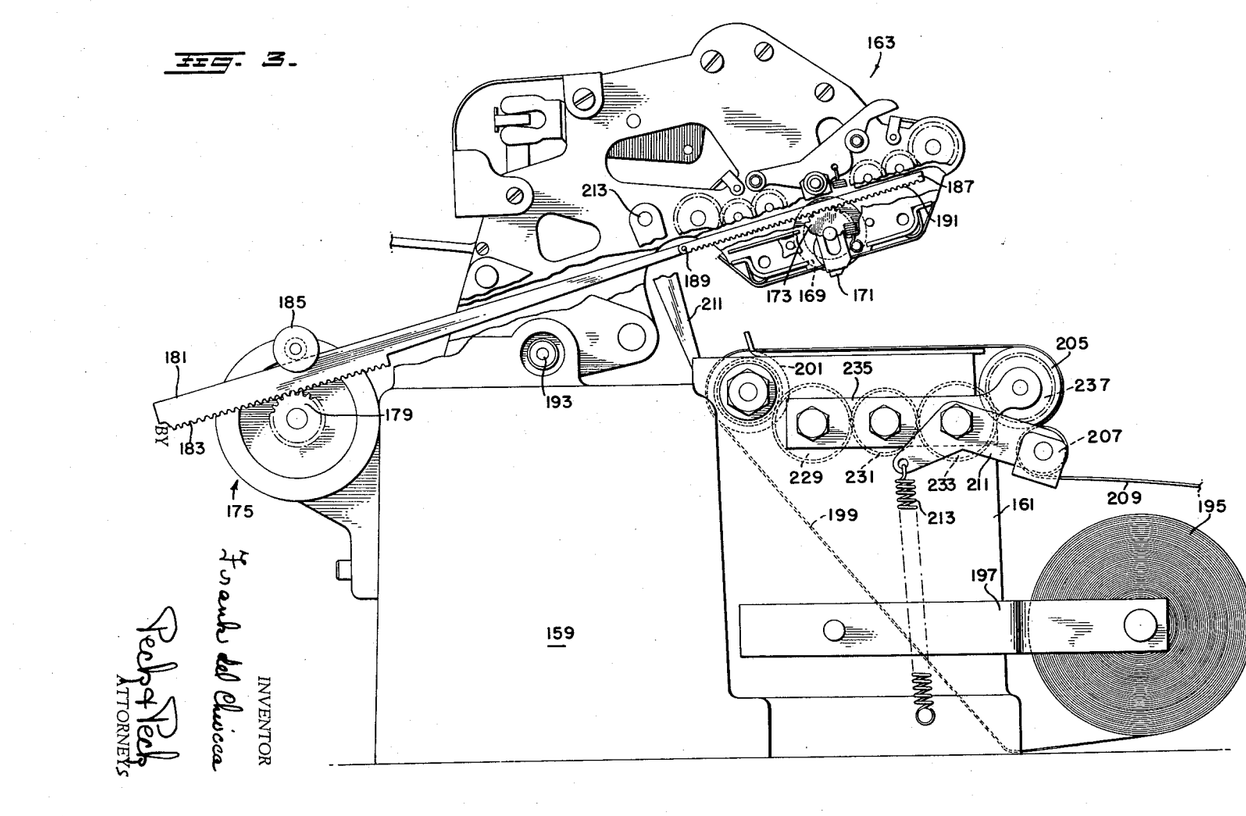
FIG. 3 is a view in side elevation, wtih parts thereof broken away, of a recording device.
Figure 5:
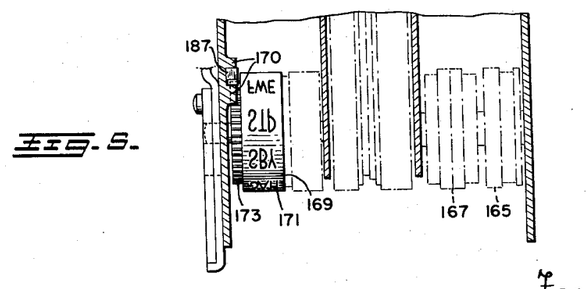
FIG. 5 is a detail view in front elevation of the recording device, particularly illustrating the printing wheels thereof.

The recorders are particularly illustrated in FIGS. 3 through 5 and may include a base or supporting pedestal 159, a forward section 161 and a stamping head 163, the latter may be enclosed in a hood 164.

As is conventional and well known in the art such recorders operatively carry in the stamp head a date wheel 165 and a time wheel 167, such wheels being rotatable to bring the correct data into proper position for being impressed on a web when the head is caused to swing down to produce an impression on the web. As will be explained hereinafter the time wheel is controlled by a master clock in the system which preferably causes rotation of said wheel every tenth of a second.

I have added to the conventional recorder head a wheel, which I shall term a "signal data wheel" 169. This wheel has engraved thereon printing lines 171 each of which corresponds to one of the signals appearing on the faces of instruments 1 and 117. This signal data wheel has fixed thereto a pinion 173 by which the wheel is rotated, as will be described, to bring the proper line of type 171 into printing position.

Each recorder mounts a synchro-receiver or selsyn designated in its entirety by the numeral 175, such synchro-receiver being preferably mounted rearwardly of the stamphead 163 of the recorder. The synchro-receiver 175 of recorder 9 is connected to synchro-transmitter 93 of instrument 1 by conductors 3 and 5 and synchro-receiver 175 of recorder 133 is connected to synchro-transmitter 121 of instrument 117 through conductors 127 and 129. Each recorder includes any suitable electrical means schematically illustrated at 177 for operating the stamping head of the recorder when energized. Such means in recorder 9 is connected to switch 81 by conductor 7 for energization when the switch is closed. The electrical means 177 of recorder 133 is connected to switch 81 by conductor 131.

A pinion 179 is operatively connected to the synchro-receiver 175 for operation thereby and a rack 181 having teeth 183 in mesh with the teeth of the pinion is caused to reciprocate when the pinion is rotated by rotation of the rotor of the synchro-receiver. The rack is maintained in operative position by means of an idler element 185 which is fixed to the synchro-receiver in such position that the rack may reciprocate between the element and the pinion. The rack 181 extends forwardly along the side of stamping head of the recorder and a further or forward rack 187 is pivotally attached as at 189 to the forward end of rack 181, the rack 187 having teeth 191 along its lower edge which are in mesh with the teeth of pinion 173 which is fixed to and imparts rotary motion to signal data wheel 169. Guide tracks 170 may be provided for the rack 187. With the parts assembled as described it will be apparent that the angular relative movements between racks 181 and 187 when the stamping head swings downwardly on its pivot 193 will be accommodated by the pivotal connection between the two racks. It will now be evident that upon rotation of pinion 179 by receiver 175 the two racks will either be projected forwardly or rearwardly with a corresponding rotary action being imparted to signal data wheel 169 to bring the type 171 corresponding to the signal given at instrument 1 into proper position for printing. When the electrical means 177 is energized to depress stamping head 163.

I provide a roll 195 of paper or the like tape for each recorder. The tape is adapted to have printed thereon the data from the wheels 165, 167 and 169 of the recorders. The roll of tape may be supported as by brackets 197 fixed to any convenient part of each recorder. The web 199 from the supply roll extends therefrom rearwardly and upwardly and over a roller 201 then forwardly over the platen 203 of the recorder and over a drive roller 205 and about a further roller 207 to extend from the recorder as at 209. I pivotally mount on each side of the recorder a generally L-shaped bracket 211, the roller 207 being supported by and extending between the forward arms of the bracket, the said arms being urged upwardly to move roller 207 into engagement with roller 205 with the web therebetween by means of springs 213 fixed at one end to any convenient part of the recorder and at their other end to a rear arm of the bracket. Thus the web will be maintained tightly against drive roller 205 so that rotation thereof will cause travel of the web.

I have devised mechanism for automatically feeding the web across the platen of the recorder each time the stamping head is depressed in a printing operation. In effecting the automatic advance of the web at each operation of the stamping head I pivotally mount a crank arm 211 on the head as at 213, the crank depending therefrom and on its lower end a link 215 is pivotally mounted as at 217. The other end of link 215 is loosely connected to shaft 219 upon which roller 201 is mounted so that the link may fulcrum about the shaft. I mount a ratchet disc 221 on shaft 219 and a drive gear 223 is fixed to disc 221 for rotation therewith. A pawl 225 is pivotally attached to pivot point 217 for operative association with teeth 227 of the ratchet disc. Three meshing gears 229, 231, 233 are journaled in journal brackets 235 fixed in any suitable manner within section 161 of the recorder, the gear 229 being in mesh with drive gear 223, while end idler gear 233 is in mesh with the teeth of a driven gear 237 fixed to roller 205.

It will now be understood that when the stamping head 163 is depressed in a stamping or printing operation, the crank 211 and the rear end of link 215 will move downwardly, the pawl 225 being drawn backwardly over teeth 227 of ratchet disc 221, and when the stamping head moves upwardly the link will fulcrum about shaft 219 and the pawl will be operatively associated with the ratchet teeth to cause rotation in a clockwise direction to the ratchet disc. Such action will cause the drive gear 223 to rotate with resultant rotation of the idler gears and of the driven gear 237 and roller 205 to draw the web across the platen to present a clean section in readiness for the next printing operation.

Figure 9A:
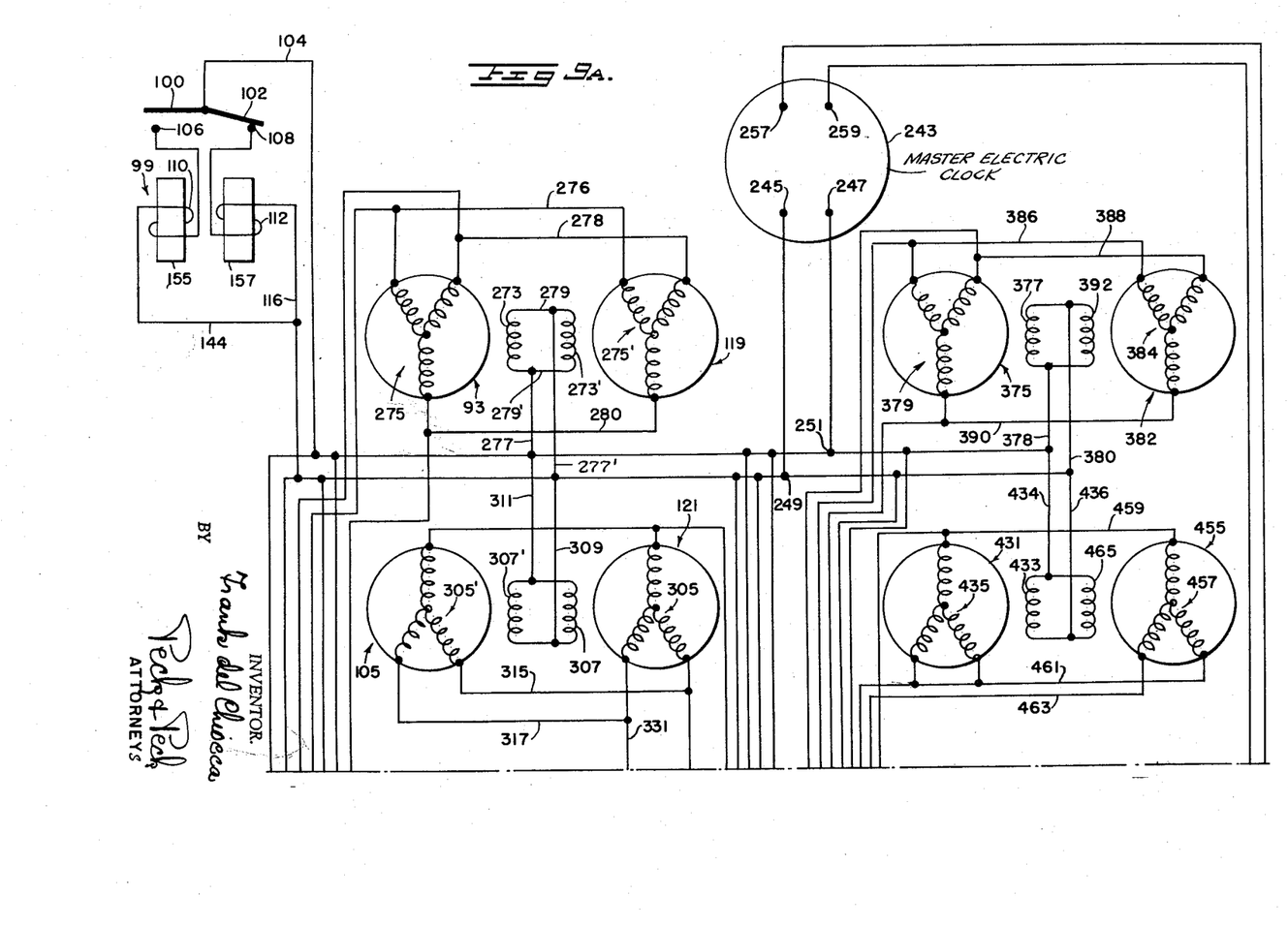
FIGS. 9A and 9B taken together comprise a schematic diagram of the electric circuit employed in my time recording maneuvering system and safety device.
Figure 9B:
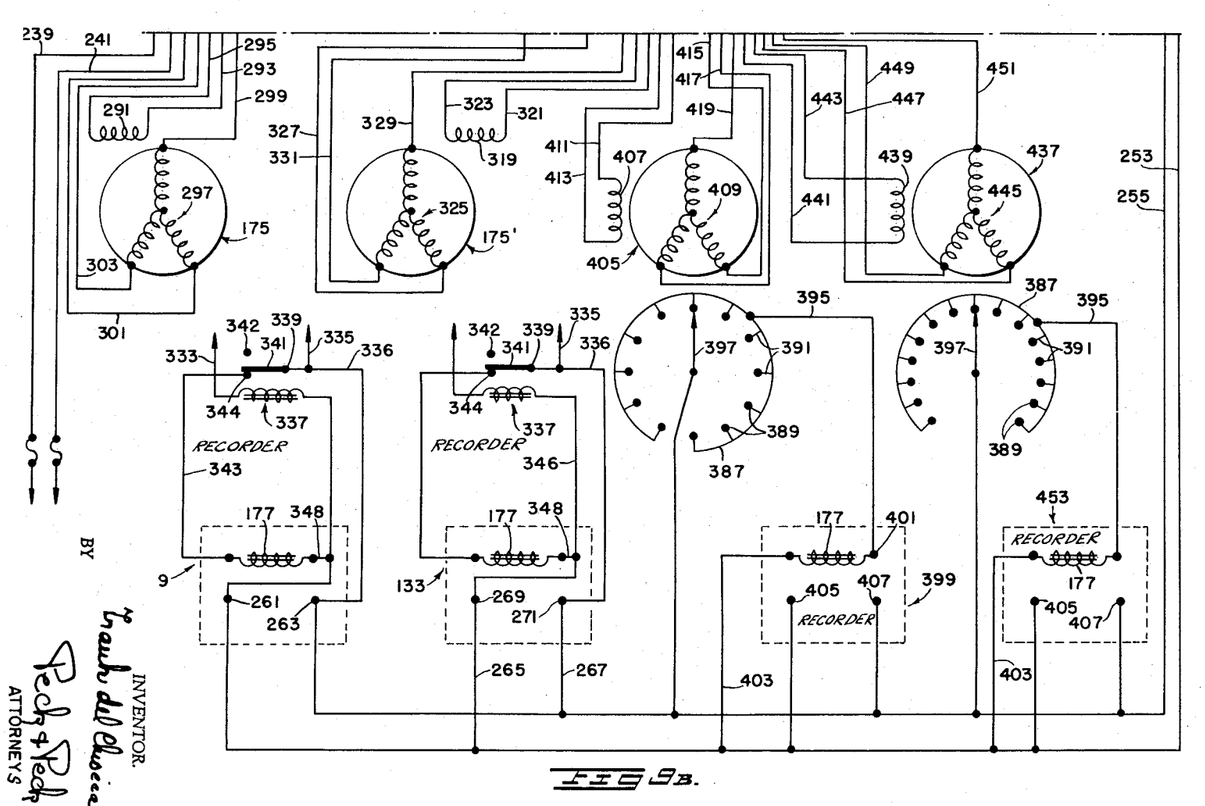

The operation of the system so far described and the electric circuit employed therein will now be described. Referring particularly to FIG. 9 of the drawings wherein I disclose leads 239 and 241 which are connected to a source of electric power which may be 115 volts, 60 cycle, A.C. and which feeds power to the electrically operated components of the system. Connected into the circuit is a master electric clock 243, the power input leads 245 and 247 being connected at 249 and 251 to the leads from the power source, while conductors 253 and 255 are connected to the clock at time control terminals 257 and 259. The recording device 9 is connected to the time control conductor 253 and 255 at terminal points 261 and 263 while recording device 133 is connected into the circuit by leads 265 and 267 extending between terminal points 269 and 271 and the conductors 253 and 255. In a conventional manner as is disclosed in Patent No. 2,214,796, the recorder wheels 165 and 167 are controlled by the clock 243.

The synchro-transmitter 93 which is located in the ship's telegraph instrument on the bridge is of generally standard construction including a rotor winding 273 and three stator windings indicated generally by the numeral 275. The synchro-receiver 119 which is located in the engine room telegraph 117 is of the same construction as transmitter 93, including rotor winding 273' and three stator windings 275'. Each rotor 273 and 273' is energized in identical fashion from power source leads 239 and 241 by means of conductors 277 and 277'. Mutual sides of the rotor windings are connected by conductors 279 and 279'. The stator windings of the transmitter 93 and receiver 119 are connected by conductors 276, 278 and 280.

Figures 6, 7, 8:
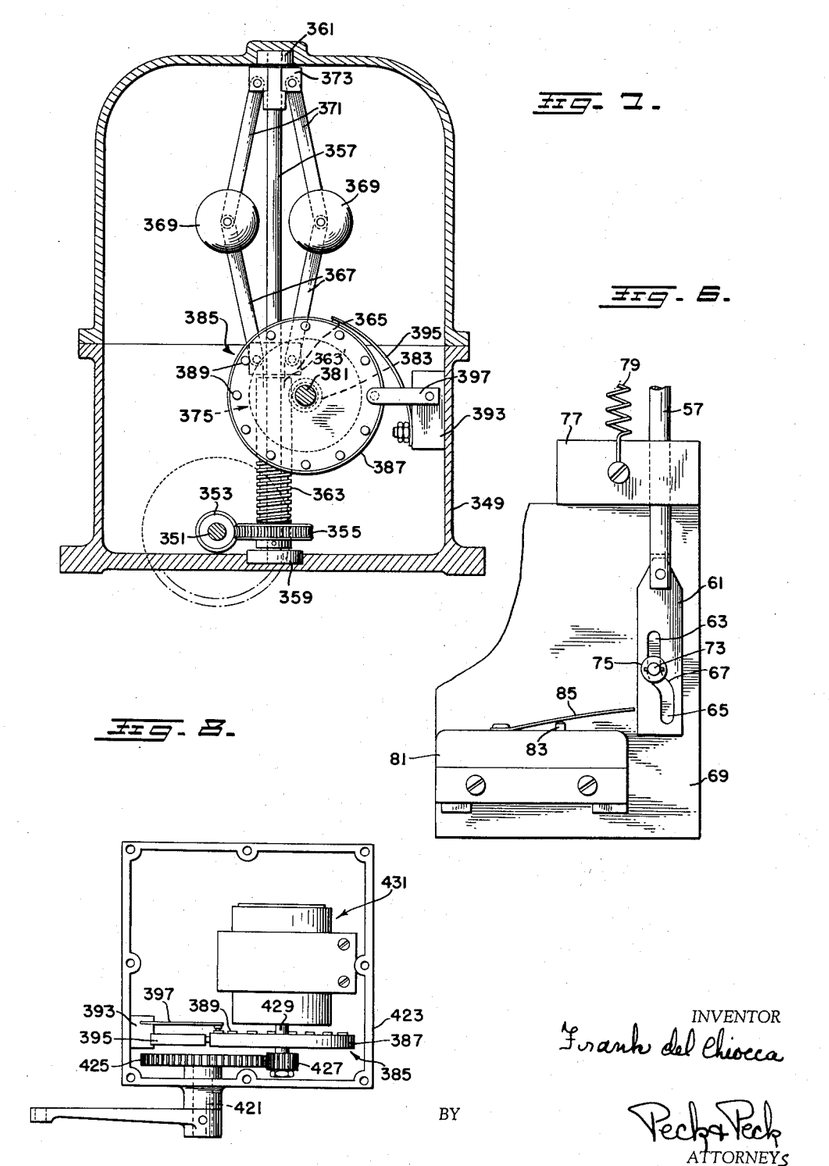
FIG. 6 is a view in side elevation of the switch actuating mechanism for causing operation of the system when a mechanical time delay mechanism is used.
FIG. 7 is a view of the mechanism for determining the r.p.m. of the engine speed.
FIG. 8 is a view of the mechanism for determining the angle of the rudder.

When the lever 29 is actuated to any one signal position the roller 45 moves up and down into and out of notches 37 of wheel 35, however its descent into fully seated position in a notch is retarded due to its being mounted on rocker arm 39 the rocking movement of which is retarded due to the dashpot 49. Thus, as the lever 29 is actuated the switch 81 will not be closed until the lever is stopped at the desired signal point and the dashpot permits roller 45 to fully seat in the selected signal notch whereupon plate 61 will descend and momentarily close the switch. The switch closing will be momentarily due to the lateral movement of plate 61 as explained.

When the delayed switching action is mechanical, i.e., involves the described dashpot arrangement, the circuits for the recorders 9 and 133 are as illustrated schematically in FIG. 10 of the drawings where I have shown the switch 81 connected at one side to conductor 281 which is connected to lead 253 and connected at its other side to operating means 177 of the recorder by conductor 283, the operating means being connected to lead 255 by conductor 285. The terminal contacts 261 and 263 of the recorder being connected to leads 255 and 253, respectively, by conductors 287 and 289. It is to be understood that the circuit of FIG. 10 is illustrative of that used in both recorders 9 and 133.

When the lever 29 of instrument 1 is actuated to the selected signal station the switch 81 will be closed and actuation of the lever will rotate gear 87 causing rotation of gear 91 which is operatively connected to the rotor 273 of transmitter 93, hence a signal will be transmitted to receiver 119 in engine room instrument 117. Receiver 119 will respond and cause rotation of a gear in instrument 117 similar to gear 109 in instrument 1 and the arrow 139 will be rotated to the signal station corresponding to signal station of lever 29 of instrument 1. Hence the engineer will move lever 29 of instrument 117 to the same station to cause the ship's engines to operate in the directed manner.

The synchro-transmitter 93 is also connected to a further synchro-receiver 175 which is associated with the recorder 9. This receiver 175 is a conventional synchroreceiver or selsyn and comprises rotor winding 291 connected to power lines 239 and 241 by leads 293 and 295, respectively, and also comprises three stator windings designated generally by numeral 297. The stator windings of the transmitter 93 and receiver 175 being connected by conductors 299, 301 and 303. When the impulse is received by receiver 175 from transmitter 93 the gear 179 (FIG. 3) is caused to rotate shifting rack 181 and rotating pinion 173 and signal wheel 171 to bring the type thereon in printing position corresponding to the signal station to which lever 29 was actuated at bridge instrument 1. The switch 81 having been closed the means 177 will be energized and the stamping head 163 of recorder will be actuated to stamp or print on the tape 199 the signal given and the time and date, and as explained above the tape will be moved.

As explained above means are provided for locking the "astern" valve when the "ahead" order is given and vice versa. This means includes the double pole double throw switch 99, which includes arms 100 and 102 which are connected by conductor 104 to power line 239. A pair of contacts 106 and 108 are connected to windings 110 and 112 which in turn are connected by conductors 114 and 116 respectively, to power line 241. The armatures 155 and 157 will be projected to lock either the "astern" or the "ahead" valve when its respective winding is energized upon swinging of arm 101 of switch 99 when wheel 95 is rotated in one direction or the other.

The synchro-transmitter 121 which is associated with engine room instrument 117 comprise the usual three stator windings indicated generally by the numeral 305 and a rotor winding 307 which is connected to power line 241 by conductor 309. The synchro-receiver 105 which is associated with bridge instrument 1 and is controlled by transmitter 121, comprises the three stator windings 305' and the rotor winding 307' which is connected to power line 239 by conductor 311. The stator windings 305 and 305' are connected by conductors 313, 315 and 317. Now when lever 29 of instrument 117 is actuated to any one signal position the switch 81 is closed in the same way the switch 81 controlled by instrument 1 is closed, since, as explained, the instrument 117 has the same switch retarding mechanism as instrument 1, and as explained above, the recorder 133 and be energized. The instrument 117 comprises gears similar to gears 87 and 91 of instrument 1 so the rotor 307 will be controlled by rotation of these gears and an impulse will be transmitted to bridge instrument receiver 105. Receiver 105 will respond and cause rotation of a gear similar to gear 109 in instrument 1 and the arrow 111 of instrument 1 will be rotated to the signal station corresponding to signal station of lever 29 of instrument 117. Hence the officer on the bridge will have a visual indication of the engine room response to the signal he has given.

The synchro-transmitter 121 is also connected to a further synchro-receiver 175′ which is associated with recorder 133. This receiver 175′ is a conventional synchro-receiver selsyn and comprises a rotor winding 319 connected into the power lines 239 and 241 by conductors 321 and 323 and also comprises three stator windings designated generally by the numeral 325. The stator windings of the transmitter 121 and receiver 175′ being connected by conductors 327, 329 and 331. The construction and operation of recorder 133 is the same as that of recorder 9 and will not be described again. However, when an impulse is received by receiver 175′ from transmitter 121 the signal wheel on the recorder 133 is rotated by the rack to dispose the proper type in printing position.

It is also within my contemplation to use an electrical means for delaying actuation of the switch to close the circuit. Such electrical means is illustrated schematically in FIGS. 9 and 11 of the drawings and in these Figs. I have used the same reference numerals to describe components similar to those hereinbefore described. I use the same notched wheel 35 in instrument 1 and 117, the roller 45 fixed on rocking arm 39 and a trip member 57′ fixed on and depending from arm 39. A switch 81a comprising two contacts, 81b and 81c, is provided with a switch arm 81d fixed at one end to contact 81c and movable to and from closed position in engagement with contact 81b. Contacts 81b and 81c are connected into the circuit by leads 333 and 335, respectively, the former being connected to heating means 337 of any suitable type while the latter is connected to conductor 336 which connects terminal point 263 (271 in recorder 133) of the recorder with one end of a bi-metallic switch arm 341 operable between contact points 342 and 344 to open and close the circuit. A conductor 343 connects contact 344 with one side of recorder operating means 177 while terminal point 261 (269 in recorder 133) is connected to lead 253 and by conductor 346 with the heating means 337. A conductor 348 connects the other side of the operating means 177 with conductor 346. The other lead 255 is connected to the recorder at terminal point 263.

Thus when switch 81a is closed the closing of arm 341 will not occur until element 337 is sufficiently heated thus delaying the full closing of the circuit. When switch 341 is closed means 177 will be energized and the stamping head of the recorder actuated to record the desired data. It will be understood that the described switching means is the same in both recorders 9 and 133.

It will now be evident from the above description that I have provided means which will automatically make a permanent record of the signal given from a ship's telegraph located on the bridge and the date and time the signal is given. It will also be appreciated that I have also provided means in the engine room for visually indicating to the engineer the signal given from the bridge instrument and my system also includes automatic means for making a permanent record of the engine room response to the given signal and the date and time thereof. The engine room response is also visually indicated on the bridge instrument. Means are also provided for locking the "astern" valve when the "ahead" order is given and vice versa.

As I have pointed out it is also desirable that my system includes means for permanently recording every change of 10 r.p.m. ahead and astern and the time and date such change was made.

In FIG. 7 of the drawings I have illustrated one form of mechanism which I may use in recording changes of 10 r.p.m. in engine speed. This mechanism may be mounted in any suitable housing 349 adjacent the engine shaft 351. I fix a worm 353 on the shaft which is in mesh with a pinion 355 fixed on a spindle 357 which is journaled at 359 in the bottom of the casing and at 361 in the top of the casing. A worm sleeve 363 is slidably mounted on spindle 357 for axial movement therealong. A bracket 365 is splined to spindle 357 and is connected to the upper end of sleeve 363 by any conventional rotary coupling 363′. A pair of arms 367 are pivotally fixed to the bracket and at their upper ends each is pivotally mounted to a ball 369 and to one of a further pair of arms 371 which are pivotally fixed at their upper ends in a fixed bracket 373. Thus a fly ball governor arrangement is provided and due to centrifugal force the balls move outwardly from the axis of rotation when the speed of rotation of the spindle increases thereby lifting the bracket and the worm sleeve axially along the spindle and of course when the speed decreases the sleeve will move axially in the opposite direction.

The apparatus for recording the changes in r.p.m. of the engine speed includes a synchro-transmitter designated generally by the numeral 375, this transmitter being similar to those hereinbefore described and having a rotor winding 377 (FIG. 9) and three stator windings 379. A shaft 381 having a pinion 383 fixed thereon is in mesh with worm sleeve 363 and is caused to rotate when the sleeve moves axially in either direction on spindle 357. Fixed on shaft 381 is a rotary switch designated generally by numeral 385, the switch having a peripheral circumferentially conducting band 387 and a plurality of circumferentially spaced contacts 389 on a side thereof each such contact being electrically connected to the band by conductors 391 (FIG. 9). Mounted on the casing 349 is a bracket 393 which mounts a brush 395 which is in constant contact with conducting band 387. A further contact member 397 is mounted on the bracket, this member being positioned to engage and make electrical contact with contacts 389 on the rotary switch as it rotates in either direction. By reference to FIG. 9 it will be seen that arm 397 is connected to time control conductor 255 and brush 395 is connected into recorder 399 at one side of recorder operating means 177 as at 401. The other side of operating means 177 being connected to time control conductor 253 by conductor 403.

The rotor of synchro-transmitter 375 is operatively associated with shaft 381 and will thus cause an impulse to be transmitted to a synchro-receiver 405 which is located at the r.p.m. recorder 399, the receiver 405 including a rotor winding 407 and three stator windings 409. The rotor 377, and 407 of transmitter 375 and receiver 405, respectively, are powered by conductors 378, 380 and 411 and 413, respectively, connected to power lines 241 and 239, respectively, while stator windings 379 and 409 are connected by conductors 415, 417 and 419.

The recorder 399 is of the same construction and operates the same as recorders 9 and 133. Thus when the circuit is closed or varied by rotation of switch 385 to make a circuit between brush 395 and switch arm 397 the means 177 of the recorder is energized and the stamping head of the recorder is actuated to print the r.p.m., the date and the time on the paper web. It will be understood that the impulse transmitted by transmitter 375 since its rotor will be actuated by shaft 381 will be transmitted to receiver 405 and through the same mechanism described above a rack is actuated by rotor 407 to shift a printing wheel into position to print the r.p.m. of the engine speed.

It is usual to provide one or more means at different locations on a ship for visually indicating the r.p.m. of the engine speed. Such means may be a dial and pointer and I have incorporated in my system electrical means for actuating the pointer to show the r.p.m. I provide a further synchro-receiver 382 having stator windings 384 connected to synchro-transmitter 375 by conductors 386, 388 and 390. The synchro-receiver has the usual rotor 392 powered by conductors 378 and 380 connected to power lines 239 and 241. The rotor is operatively connected in a conventional manner to the usual spindle of the pointer to cause the pointer to move over the dial in accordance with the actuation of rotor 392 under the influence of the impulses received from transmitter 375.

A generally similar arrangement for recording rudder angle simultaneously with the date and time is illustrated in FIGS. 8 and 9 and in this particular description I shall use the same reference numerals to describe parts similar to those shown in FIG. 7.

I provide a spindle 421 connected in any suitable manner to the rudder shaft of the ship. This spindle extends through a housing 423 and mounts on its inner end a gear 425 in mesh with a pinion 427 fixed on a stub shaft 429. A rotary switch 385 having a peripheral conducting band 387 and spaced contacts 389 connected to the band by conductors 391. A brush 395 mounted on a bracket 393 is in electrical contact with the conducting band while an arm 397 is positioned to be engaged by contacts 389.

I provide a synchro-transmitter 431 having a rotor winding 433 connected to shaft 429 and actuated thereby. The transmitter 431 includes stator windings 435. I provide a synchro-receiver 437 which includes a rotor winding 439, the rotor 439 being connected to leads 239 and 241 by conductors 441 and 443, while rotor 433 is powered by conductors 434 and 436. Receiver 437 also includes stator windings 445, the stator windings 435 and 445 being connected by conductors 447, 449 and 451.

It is usual to provide one or more means at different locations on a ship for visually indicating the rudder angle. Such means may comprise a dial and pointer and I have incorporated in my system electrical means for actuating the pointer to visually indicate the rudder angle. I provide a further synchro-receiver 455 having stator windings 457 connected to transmitter 431 by conductors 459, 461 and 463. The receiver 455 has the usual rotor 465 powered by conductors 434 and 436 connected to power lines 239 and 241. The rotor is operatively connected in a conventional manner to the usual spindle of the pointer to cause the pointer to move over the dial in accordance with the actuation of rotor 465 under the influence of the impulses received from transmitter 431.

The rudder angle recording system includes a recorder 453, which is the same as recorder 399. When a circuit is made from a contact 389 to brush 395 it will be recognized that operating means 177 is energized and the stamping head of the recorder will be actuated since the circuit is completed through conductor 403. The recorder 453 is connected to a rack which rotates a printing wheel having the rudder angles engraved or otherwise formed thereon. Thus the recorder 453 makes a permanent record on the tape of the rudder angle and the data and the time.

I claim:

1. Apparatus for recording the r.p.m. of the engine shaft of a vessel and the time when the r.p.m of the engine shaft is varied including, in combination, an engine shaft, an electric circuit and a power source therefor, a time control means connected in said circuit and a recorder device connected in said circuit and provided with printing means for printing the time controlled by said time control means, an electric switch in said circuit operable to cause the actuation of said recorder when the switch is closed, rotatable means connected to said engine shaft and caused to rotate by the rotation of said engine shaft, mechanism connected to said means and caused to operate solely when the speed of rotation of said means is varied, connecting means connected to said mechanism and caused to operate when said mechanism is operated and said connecting means being connected to and closing said electric switch when the connecting means is operated, an electrical impulse transmitting means operatively connected to said connecting means and connected in said circuit, an electrical impulse receiving means at said recorder, a movable printing means in said recorder operatively connected to said impulse receiving means and said impulse transmitting means being connected to said impulse receiving means whereby the latter is actuated by a transmitted impulse to actuate said movable printing means to print the r.p.m. of the engine shaft when said switch is closed.

2. Apparatus for recording the r.p.m. of the engine shaft of a vessel and the time when the r.p.m. of the engine shaft is varied in accordance with claim 1, wherein said rotatable means comprises a spindle operatively connected to the engine shaft for rotation therewith and said mechanism comprises a governor connected to said spindle for rotation therewith and axial movement relative thereto, and said connecting means comprises a worm sleeve slidably mounted on said spindle for axial movement therealong, said worm sleeve being connected to said governor and axially moved thereby in accordance with the speed of rotation of the spindle, and said switch and impulse transmitting means are operatively connected to said worm sleeve.

3. Apparatus for recording predetermined variations in the r.p.m. of the engine shaft of a vessel and the time such predetermined variations occur, including in combination, an engine shaft, an electric circuit and a power source therefor, a time control means connected in said circuit and a recorder device connected in said circuit and provided with printing means for printing the time controlled by said time control means, a rotary electric switch in said circuit having circumferentially spaced contacts thereon, the spacing of the contacts being calibrated to the predetermined variations in r.p.m. to be recorded, said rotary electric switch being connected in said circuit and being rotatable to cause actuation of said recorder when the switch is closed, means connecting said switch to the engine shaft, and said means being operable solely upon variations in the r.p.m. of the engine shaft to cause rotation of the switch when the r.p.m. of the engine shaft varies, and closing of the switch when the variation in r.p.m. of the engine shaft reaches the predetermined amount, an electrical impulse transmitting means operatively connected to said means and connected in said circuit, an electrical impulse receiving means at said recorder, a movable printing means in said recorder operatively connected to said impulse receiving means and said impulse transmitting means being connected to said impulse receiving means whereby the latter is actuated by a transmitted impulse to actuate said movable printing means to print the r.p.m. of the engine shaft when said switch is closed.

References Cited in the file of this patent

UNITED STATES PATENTS

| | | |
|---|---|---|
| 991,586 | Wilson | May 9, 1911 |
| 1,054,206 | Isakson | Feb. 25, 1913 |
| 1,787,066 | Carter et al. | Dec. 30, 1930 |
| 1,978,992 | Donnelly | Oct. 30, 1934 |
| 2,031,970 | Mead | Feb. 25, 1936 |
| 2,385,399 | Branham | Sept. 25, 1945 |
| 2,513,668 | Parker | July 4, 1950 |
| 2,579,476 | Curry | Dec. 25, 1951 |
| 2,598,668 | Barry | June 3, 1952 |
| 2,722,680 | Edelblut | Nov. 1, 1955 |
| 2,857,928 | Lerner | Oct. 28, 1958 |
| 2,911,636 | Brouse | Nov. 3, 1959 |